United States Patent [19]

Zar et al.

[11] 4,008,444
[45] Feb. 15, 1977

[54] FEEDBACK CONTROL OF A LASER OUTPUT

[75] Inventors: Jacob L. Zar, North Andover; Robert E. Serris, Burlington, both of Mass.

[73] Assignee: Avco Everett Research Laboratory, Inc., Everett, Mass.

[22] Filed: Jan. 19, 1976

[21] Appl. No.: 650,309

[52] U.S. Cl. .................... 331/94.5 S; 331/94.5 PE
[51] Int. Cl.[2] .......................................... H01S 3/13
[58] Field of Search .................... 331/94.5; 330/4.3

[56] References Cited
UNITED STATES PATENTS

| | | | |
|---|---|---|---|
| 3,633,124 | 1/1972 | Danielmeyer | 331/94.5 S |
| 3,702,973 | 11/1972 | Daugherty et al. | 331/94.5 PE |

Primary Examiner—William L. Sikes
Attorney, Agent, or Firm—Charles M. Hogan; Melvin E. Frederick

[57] ABSTRACT

In a method and apparatus for producing and controlling a beam of radiation such as a laser beam issuing from a gaseous working medium in a working region wherein the gas is subjected to an electric field and an ionizing beam is directed to the gas, ionizing the gas and producing therein secondary electrons sufficient to support laser action, the power of the laser radiation is controlled by controlling the power of the electron beam and the electron beam power is controlled by an electrical feedback signal from a radiation detector that detects a fraction of the laser radiation.

21 Claims, 12 Drawing Figures

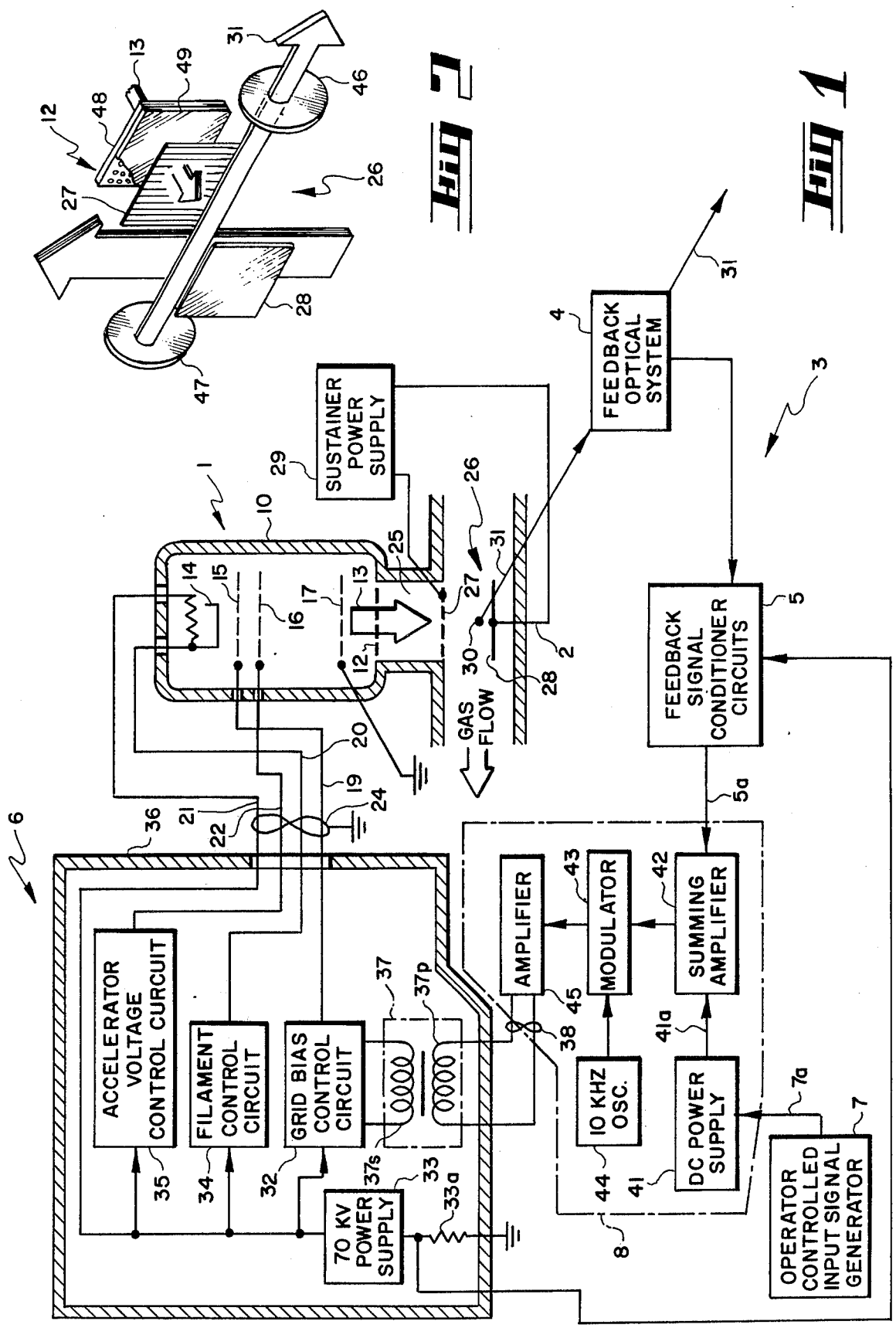

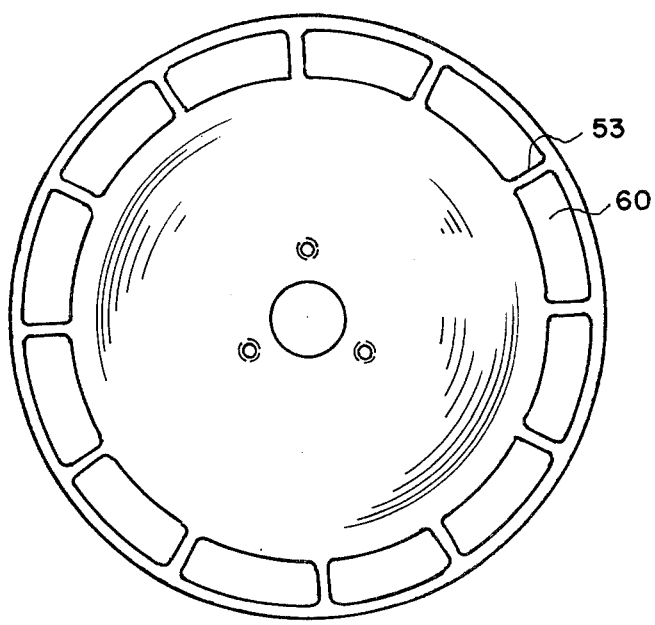
Fig. 4
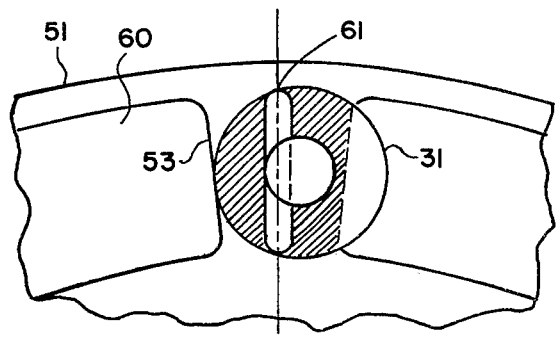
Fig. 5
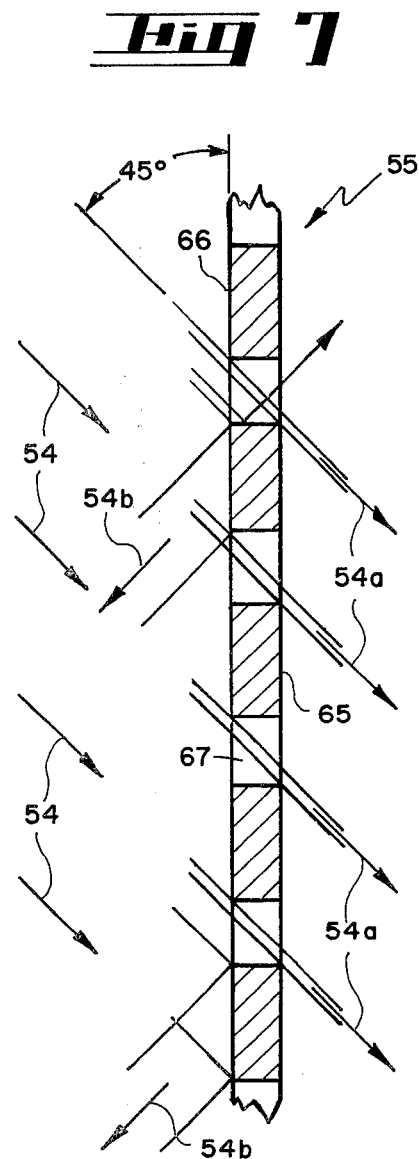
Fig. 7
Fig. 6
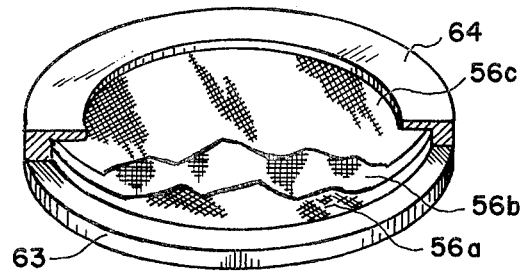
Fig. 8

FEEDBACK CONTROL OF A LASER OUTPUT

BACKGROUND OF THE INVENTION

The present invention relates to lasers and more particularly to electric discharge gas lasers (EDL) wherein an electric discharge in a gaseous medium produces a population inversion of energy states in the medium sufficient to support the laser action.

A laser beam is a beam of coherent electromagnetic radiation which by virtue of its coherence is highly directional and so the laser beam can be projected great distances with little spreading of the beam. Because the laser beam possesses space coherence, it can be focused to form a small spot. Hence, enormous power densities can be obtained.

An electron beam laser is described in U.S. Pat. No. 3,702,973, issued Nov. 14, 1972 entitled "Laser or Ozone Generator in Which a Broad Electron Beam with a Sustainer Field Produce a Large Area Uniform Discharge" to Daugherty et al. This patent describes a structure and method for operating a relatively large diameter, high pressure gas electric discharge gas dynamic laser in which the medium contains $CO_2$. A spacially uniform controlled electric discharge is produced in the working region by introducing ionizing radiation (a broad electron beam) into the laser optical cavity through a wall of the cavity to produce a substantially uniform predetermined density of secondary electrons in the gaseous medium by ionizing the medium and at the same time providing a sustainer electric field which is uniform throughout the working region of the laser and which provides a predetermined electron temperature which is calculated to increase the average energy of secondary electrons in the working region without substantially increasing the predetermined electron density in the region. This patent describes a method and structure for producing a uniform controlled discharge in a gaseous medium in a relatively large tube at relatively high pressure. The sustainer field direction, the laser beam direction and the gas flow direction may be mutually orthogonal.

In operation, the ionizing electron beam is generated outside the laser cavity by an E-beam generator and there is a broad area uniform beam of sufficient cross section dimension to cover the relatively large working region of the laser. A suitable structure for generating such a broad area uniform electron beam is described in U.S. Pat. No. 3,749,967 which issued July 31, 1973 entitled "Electron Beam Discharge Device" by Douglas-Hamilton et al. The beam is transmitted into the laser cavity through an electron window and into the working region bounded by the sustainer field. A portion of the laser optical cavity is included in that sustainer field and in the optical cavity.

In the high power electron discharge such as described in the above-mentioned U.S. Pat. No. 3,702,973, the output laser power is approximately proportional to the input power to the sustainer section. The sustainer section includes an anode and a cathode with the gaseous working region in between and so the working region of the laser is defined by this anode and cathode. It is the discharge between the anode and the cathode, uniformly maintained, that pumps the laser and so provides the inverted population of energy states necessary for laser action. Since the laser output power is proportional to the input power to the sustainer, the output power can be controlled by controlling the sustainer voltage. This technique has been effective for gas lasers of smaller size. However, it is not as effective for lasers of larger size, particularly where the laser output power must be changed rapidly. For relatively large electron beam lasers, the density of the electron beam projected into the working region between the sustainer electrodes is controlled while the sustainer voltage is held constant. Thus, the sustainer current is varied to vary output power of the laser. This, in turn, depends upon the ion concentration produced in the working region by the ionizing electron beam.

The ionizing electron beam is produced by the E-beam system which is an external electron accelerating device that generates a broad area electron beam which is projected through an electron window into the working region of the laser. In the E-beam device, electrons emitted by a cathode are accelerated by anodes and so the energy of the electron entering the working region of the laser is determined by the accelerating anode voltage. Usually, the accelerating anode voltage is maintained constant and the voltage on a control grid located between the accelerating anodes and the cathode is varied. This grid controls the density of the electron beam that is injected into the sustainer working region of the laser. Very abrupt changes in the laser output power can be achieved by abruptly changing the voltage on this control grid in the E-beam system. Thus, the E-beam device and the sustainer device operate in conjunction in a fashion similar to a tetrode vacuum tube to control the output power of the laser, that output power being controlled by a grid potential in the E-beam device.

Heretofore, an electron beam $CO_2$ laser constructed and operated as described above and including an E-beam device and a sustainer has included a null-type feedback control system. The feedback control system detects or senses the current in the electron beam and compares that current with a standard preset by the operator, producing a control signal that represents the difference. The control signal is applied to the E-beam device control grid. That feedback system, intended particularly to compensate for variations which might result from such things as changes in power line voltage, drifts in component values in the power supply or other factors that could affect the amplitude of the E-beam current. It was not completely effective to correct perturbations in the laser beam output and so was less effective than desirable where the output laser beam must be maintained steady and substantially free of perturbations or where the beam power must be changed abruptly as when the beam is pulsed.

SUMMARY OF THE INVENTION

The present invention is a control system for a laser using a feedback loop including an optical system and an electrical system. The combined optical and electrical systems that make up the feedback have general use in electrical discharge lasers and have particular use in the control of an electron beam laser and all embodiments described herein are in regard to such a laser.

It is an object of the present invention to provide a method and means in a laser system for controlling the power of the laser beam.

It is another object of the present invention to provide a method and means in an electrical discharge laser system for controlling the power of the laser beam.

It is another object to provide a method and means in an electrical discharge flowing gas $CO_2$ laser system for controlling the power of the laser beam.

It is another object to provide apparatus for detecting a laser beam and producing an electrical signal representative of the beam power.

It is another object to provide a feedback system for a laser which maintains the laser output beam substantially steady and free of perturbations.

It is another object to provide a feedback system for a laser which maintains a laser output beam substantially steady and free of perturbations after the beam power is changed abruptly in response to an input control.

It is another object to provide an improved null-type feedback control system for an EDL $CO_2$ laser.

In accordance with the present invention, an optical system periodically intercepts a laser beam and directs the intercepted radiation through optical attenuators to a radiation detector which produces an electrical signal representative of the power of the periodically intercepted beam and consisting of a series of pulses at the rate of interception of the laser beam. The successive pulses are combined by a conditioning circuit which produces a substantially steady signal level that is proportional to the power of the laser beam. That signal level is compared with a standard signal level controlled by the operator producing a difference signal that is used to control the E-beam device. The difference signal may be amplified and applied directly to the grid of the E-beam device, or as in one embodiment described herein the difference signal is transmitted by a telemetry transmitter to a telemetry receiver at the location of the E-beam device where the received difference signal is extracted, amplified and applied to control the grid of the E-beam.

In a preferred embodiment of the present invention, in regard to the optical part of the feedback system, the entire output laser beam is periodically sampled by reflective mirror portions on a rotating wheel. The reflected output beam radiation is attenuated several orders of magnitude in the optical system and focused on the radiation detector that produces a signal representative of the power of the reflected radiation. In this optical system, there is a beam splitter that directs a substantial portion of the radiation reflected by the mirror portions to a power meter that indicates the output power of the laser.

The preferred embodiment of the present invention also includes a signal conditioning circuit that conditions the signal from the radiation detector. More particularly, the pulse train from the detector is capacitively coupled to an amplifier, the output of which is then fed to a full-wave rectifier. The output of the rectifier circuit has a filter capacitor which smooths the output signal to produce a substantially steady output level which is indicative of the power output of the laser beam and is substantially free of power line frequency harmonics that appear in the output laser beam. The output can then be compared with the standard signal level controlled by the operator to produce the difference signal that controls the E-beam device.

In order to make this feedback control system more responsive to abrupt changes in the laser output beam power level, as when the beam is intentionally pulsed, a signal derived from the E-beam device and representative of the E-beam current is differentiated and added to the averaged signal and then the sum of these two is compared with the standard controlled by the operator. The purpose of adding the differential of the E-beam current to the averaged signal derived from the output laser beam is to improve the transient response of the control system. It should be noted that the averaging process is inherently slower than the detector, and while the averaged signal is quite effective to control the laser during substantially steady operation, it is too slow to respond to abrupt changes in the laser output power as when the laser is pulsed. On the other hand, the E-beam device, and more particularly the E-beam current, directly turns the laser beam on and off and this current may even slightly lead the laser beam. Hence, the sum of the differential of the E-beam current and the control signal stabilizes the laser power control circuit and in effect permits a fast response where it is needed.

These and other objects and features of the present invention will be apparent from the specific description of embodiments of the invention taken in conjunction with the figures described below.

DESCRIPTION OF THE DRAWINGS

FIG. 1 is a diagram illustrating the related structures, system and apparatus for carrying out the process of the present invention in an electron beam flowing gas $CO_2$ laser;

FIG. 2 is a perspective diagrammatic view illustrating the directions of electron generation, gas flow and laser direction in the sustainer or working region of one type of electron beam laser;

FIG. 4 is a front view of the spoked reflecting wheel of the optical system;

FIG. 5 is an enlarged view of a reflecting spoke of the wheel showing the incident laser output beam;

FIG. 6 is a wave form representing the electrical signals produced by a pyroelectric detector in the optical system;

FIG. 7 is a cross section view of a perforated beam splitting mirror in the optical system;

FIG. 8 is a partially cross section view of a fine mesh screen radiation attenuator for reducing the intensity of the feedback laser beam several orders of magnitude;

DESCRIPTION OF EMBODIMENTS OF THE INVENTION

Figure 3:
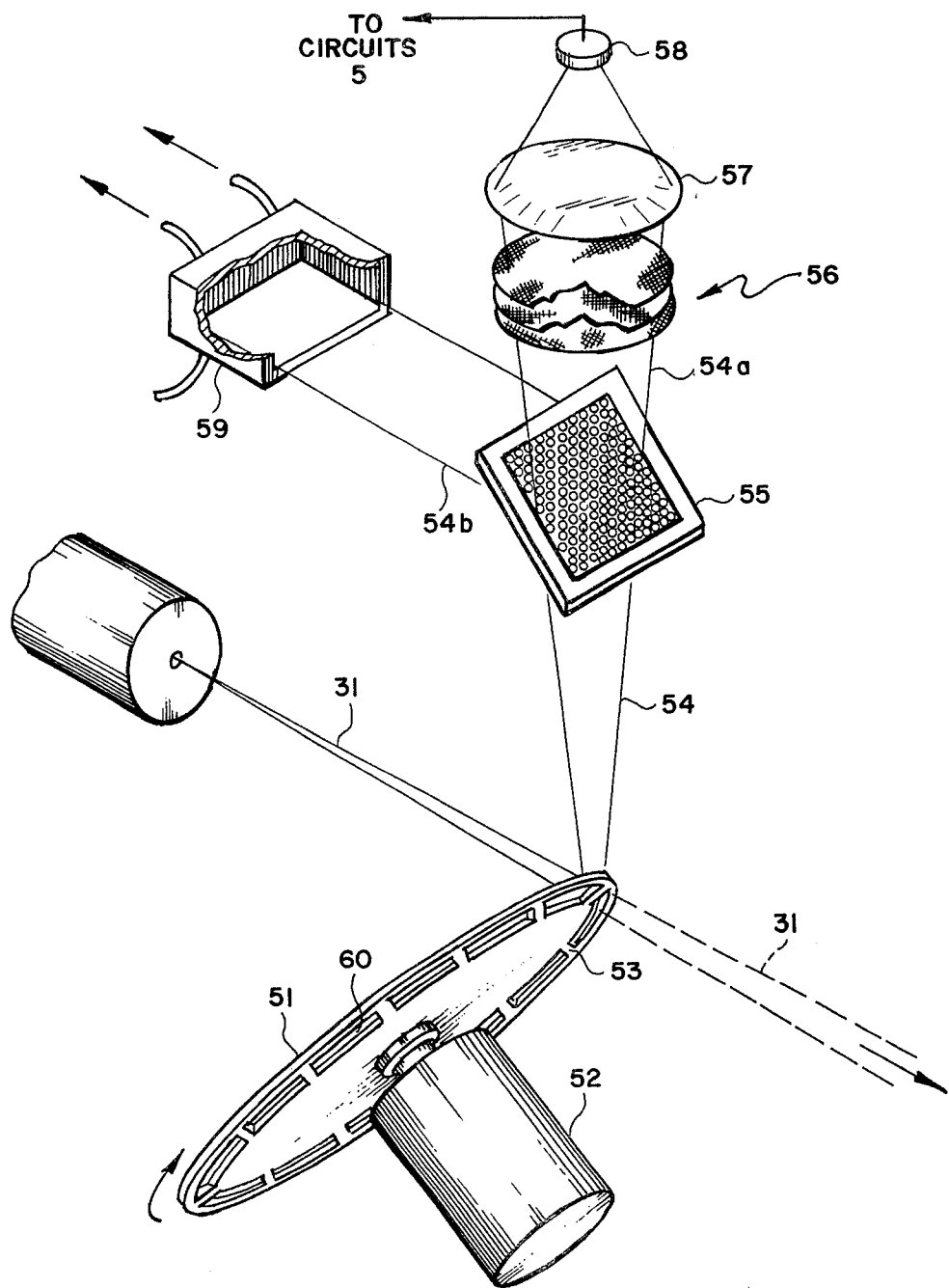
FIG. 3 is a pictorial view of the optical system that is part of the overall feedback system that intercepts a fraction of the laser output radiation for detecting the power thereof and generating the feedback signal.

The diagram in FIG. 1 represents the E-beam generator 1, the sustainer device 2 and the laser working region 26, the feedback control system 3, including the optical and electrical sub-systems thereof, denoted 4 and 5 respectively, the high voltage power supply 6 which supplies power to the E-beam generator, the operator-controlled input 7 and the feedback and input combining and transmitting circuit 8. The purpose of the feedback and the operator-controlled input is to control the electron beam from the E-beam generator that energizes the gaseous laser medium in the working region of the sustainer. The operator-controlled input signal from control 7 and the electrical feedback signal from the electrical feedback subsystem 5 (herein called the conditioner circuit) are combined in circuit 8 producing the E-beam grid control signal that is transmitted to the high voltage power supply 6 for controlling the grid of the E-beam.

The E-beam generator 1, as briefly represented in FIG. 1, includes an envelope 10 having a vacuum barrier electron window 12 at one end, adapted to permit the electron beam 13 generated within the envelope to emerge from the window. Within the envelope are disposed a cathode 14, a control grid 15 and accelerating anodes 16 and 17. Voltage to these is supplied from the E-beam high voltage power supply 6 via lines 19 to 22 contained in the shielded cable 24. The anode 17 is grounded, cathode 14 is negative with respect to ground and the voltage on anode 16 lies at some potential therebetween. Thus, the density of electrons which flow from the cathode and reach the accelerating field between the anodes 16 and 17 depends upon the voltage on the control grid 15. The electrons accelerated by the accelerating field between the anodes 16 and 17 penetrate the window 12 and emerge from that window as a broad area beam of electrons of reasonably uniform energy, the density of this beam being determined by the grid voltage.

The broad electron beam drifts across the short space 25 which contains the gaseous laser medium at the operating pressure of the laser. Thus, the beam emerges from the vacuum of envelope 10 into a region of substantial gas pressure and penetrates into the working region of the laser, denoted 26. This working region lies between the sustainer electrodes 27 and 28 which are spaced so that the laser gas flows between these electrodes. The laser optical axis 30 also lies between these electrodes and the direction of the laser beam, the direction of gas flow and the optical axis of the laser cavity are mutually orthogonal.

The sustainer electrodes are provided with voltage from the sustainer power supply 29 such that a substantially fixed voltage differential is applied across these electrodes and, so the power to the sustainer electrodes depends upon the impedance therebetween as determined by the density of ions produced in the working region by the incident electron beam 31.

The voltage on the control grid 15 in the E-beam device is controlled by the grid bias control circuit 32, located in the high voltage power supply 6. The cathode 14 of the E-beam is negative with respect to ground at about 70 kv or higher. The cathode connects to the high voltage output of the 70 kv supply 33 in the high voltage power supply 6. The E-beam grid 15 is also at about 70 kv negative, give or take the grid voltage which is determined by the grid control circuit 32. The cathode filament is controlled by the filament control circuit 34 and accelerating anode 16 is controlled by circuit 35, both in the high voltage power supply 6. Thus, the grid, cathode, cathode filament and anode accelerating control circuits and the 70 kv power supply are all contained within the enclosure 36 of the high voltage power supply.

The E-beam control grid voltage may be telemetered to the grid control circuit rather than transmitted to it via hard copper wires. For this purpose, the isolation transformer 37 is the link between the 70 kv voltage level inside the power supply enclosure 36 and the E-beam generator and the outside world.

The feedback system for a laser beam 31 begins with the optical sub-system 4 that intercepts the output laser beam intermittently and directs part of the intercepted portion of the beam through optical beam splitters and attenuators to an optical radiation detector that produces electrical signal pulses, each pulse being proportioned to the laser beam energy that is intercepted.

The pulses from the radiation detector are fed to the feedback signal conditioner circuits 5. The conditioner circuits respond to the pulses and, in some embodiments of the present invention, respond to other signals derived from the high voltage power supply 6 to produce in the output thereof, in line 5a, a substantially steady electrical signal level that represents the steady power level of the laser beam. That signal is fed to the combining and transmitting circuits 8 where it is compared with a signal derived from the operator controlled input signal generator 7 in line 7a, producing a difference signal that is used to control the E-beam grid.

In the combining and transmitting circuits 8, the operator controlled input signal in line 7a controls a DC power supply 41 that produces a standard control signal in line 41a that represents the operator's control signal. This standard signal is compared with the conditioned feedback signal from line 5a by the action of summing amplifier 42. Thus, the output of the summing amplifier reflects the difference of the feedback signal from the standard signal. This difference signal is fed to modulator 43 where it is used to amplitude modulate a 10 kHz signal from oscillator 44. The modulated signal is amplified by amplifier 45 and transmitted or applied directly to the isolation transformer 37 in the high voltage power supply 6. Modulator 43, amplifier 44 and the primary, 37p, of the isolation transformer 37 may be considered as a telemetry transmitter. The 10 kHz modulated signal appearing on the secondary, 37s, of this transformer, is demodulated and applied to the E-beam control grid 15 by the grid bias control circuit 32. In circuit 32, the modulated 10 kHz is rectified by a bridge rectifier, filtered to remove ripple and added to the 70 kv voltage that is applied to the E-beam grid. Thus a closed loop feedback control system is provided which samples the power of the laser beam to provide a feedback signal representative thereof and compares that signal with the output of the operator's control 7 to produce a difference signal. The difference signal is then transmitted to the grid control bias circuit 32 to change the grid voltage as required to change the laser output power to eliminate the difference.

The coordinates associated with the electron beam, the direction of gas flow and the optical cavity of the laser are illustrated in FIG. 2. These directions are named accordingly. The gaseous medium flowing through the device in a direction identified as gas flow, may be, for example, 16% $CO_2$, 34% $N_2$ and 50% He, supplied from a suitable source (not shown). This gas is directed through the working region 26 of the laser optical cavity defined by the laser mirrors 46 and 47. Additional details of the laser, sustainer and E-beam generator are found in the patents mentioned herein.

As described also in U.S. Pat. No. 3,702,973, the inside of the E-beam generator envelope 1 is evacuated so that the broad area electron beam 13 can be formed and controlled therein. This beam is launched towards the reticulated conducting plate 48 which is part of the window 12 in the envelope. The plate 48 may be made of stainless steel or the like and is covered with a thin sheet of a material or diaphragm 49 which possesses adequate structural stability to withstand the pressure differential between the inside of the envelope and the region 25 and yet transmits the electrons without absorbing an excessive portion of their energy which would cause a failure of the diaphragm.

The broad area beam 13 emerging from the window 12 into the region 25 passes through a reticulated cathode plate 27 which may be constructed of wire mesh, and into the working region 26. In the working region, electron energy is maintained by the sustainer electric field between the oppositely disposed anode and cathode plates 28 and 27, respectively, which are coupled to the sustainer power supply 29.

The ionizing electron beam thus provided, penetrating into the working region of the laser provides a source of secondary electrons in the working region at a very low electron temperature and increases the efficiency by the electric discharge as is more fully explained in the above-mentioned U.S. Pat. No. 3,702,973. In accordance with the present invention, the electron beam is also controlled by feedback from the output laser beam and, in turn, controls the output power of the laser beam. More particularly, in accordance with the present invention, the density of the wide area electron beam that penetrates into the working region 26 is electronically controlled in the E-beam generator 1.

The feedback loop acts to control and keep power in the laser beam constant at the level called for by the operator controlled input signal. The optical sub-system in the feedback loop samples the laser beam power by periodically intercepting the full output beam and directing the intercepted radiation to a radiation detector that produces an electrical signal and from that electrical signal, a feedback electrical signal is derived which is combined with the input signal to control the laser output power. The optical sub-system is shown in FIG. 3 and consists of a spoked wheel 51 driven by an 1,800 rpm synchronous motor 52. Mirrors on the spokes 53 of the wheel interrupt the laser beam 31 and reflect a small portion, for example, approximately 3% of the total output power of the beam. This reflected portion of the beam, denoted 54, is all directed to a perforated mirror 55 which performs analogous to a beam splitter. Some small percentage, for example, about 1% of the sample radiation 54 from the laser beam passes through mirror 55 and is denoted beam 54a. The beam 54a, which is, for example, now one percent of three percent of the power of the initial laser beam 31, is further attenuated by the mesh screen radiation attenuator 56 and then focused by lens system 57 onto a pyroelectric radiation detector 58. Meanwhile, the major portion of the laser beam sample 54 is reflected by the perforated mirror 55, as beam 54b, onto a differential thermocouple power meter 59. The power meter is made to observe the power of the laser and is particular to ascertain that it is operating at a steady average value.

The laser beam 31 from a typical electron beam laser such as described in the present application is annular in form. In other words, in the cross section of the beam, the intensity of radiation at the center is low or even zero while towards the edges of the beam, the intensity is much greater. Furthermore, typically, the power density at corresponding points across the beam may be different. For example, around the annulus of the beam at a given radiation from the center of the beam, power density may vary. Furthermore, all these variations may be temporal. Thus, in order to insure that the samples of the beam truly represent the full power of the beam, each sample sweeps the whole beam in cross section. Furthermore, the whole sample must be transmitted through a portion of the perforated mirror 55 and the mirror must be uniformly perforated so that the transmitted portion 54a is in all respects totally representative of the sample 54. In addition, the fraction 54a of the sample must be uniformly attenuated by the screens 56 and all of the remaining radiation focused onto the active surface of the pyroelectric radiation detector 58. It should be noted that the area of surface of such a radiation detector has dimensions on the order of a few square millimeters. These requirements of the optical sub-system are all taken into consideration in the conception and reduction to practice of the sub-system and in the design of each of the parts of the system.

Another important factor that is taken into account in the total feedback loop is that the amplitude of the radiation 54a that impinges on the active surface of the pyroelectric detector is pulsed and these pulses have a wave form which has a double hump shape that occurs because of the annular cross section shape of the beam and the way the beam is sampled to produce the pulse. Accordingly, the electric signal pulses from the pyroelectric detector 58 are represented by a wave form which has the same double hump shape.

The reason for the double hump form of the pulses from the detector 58 is illustrated by FIGS. 5 and 6. FIG. 5 is an enlarged view of one of the spokes of the sampling wheel and the output laser beam 31. The sampling wheel, shown also in FIG. 4, has twelve spokes, or stated in another way, it has twelve equal openings such as opening 60 through which the laser beam 31 projects as the wheel turns and these openings are large enough so that when in registration with the beam 31, the complete beam clears the wheel and none of it is intercepted by the wheel. The relationship between the number of spokes or openings in the wheel, the speed of rotation of the wheel and the frequency of the electric power that energizes the electrical parts of the laser is described hereinbelow.

Referring again to FIGS. 4, 5 and 6, each spoke of the wheel carries a radiation reflector, such as reflector 61. The reflector extends radially in the spoke and is a material that is highly reflective of radiation of the wavelength of the laser beam. For example, if the laser radiation wavelength is on the order of 10.6 microns, then the reflectors may be made of copper or silver or copper-plated steel. These are examples of but a few suitable materials. Clearly, the whole wheel can be made of such reflective material. Each spoke that intercepts the beam reflects a portion of the beam and contributes to the reflected beam 54.

The reflectors at the wheel spokes are long enough to span the full dimension of the laser beam 31 when the reflector passes across the beam. For example, if the angle of reflection or deflection of the portion 54 of the laser beam be 90°, the spoked wheel is set at an angle of 45° to the direction of the output laser beam 31. Hence, the reflector is at 45° to the beam axis and so the length of the reflector must be greater than the cross section dimension of the beam in order that all of the beam be intercepted by the reflector when the reflector crosses the beam.

The reflector should be optically flat and have sharp edges so that all reflected radiation is contained within the cone of radiation 54.

Where the electrical power that energizes the high voltage power supply 6 and the sustainer power supply 29 is derived from a sixty cycle source, then it is preferred that the spoked wheel rotate at a sub-harmonic of 60 cycles. For example, the spoked wheel may be driven at 1,800 rpm by a synchronous motor 52. It is preferred that the speed of the wheel be a sub-harmonic of the source voltage frequency because the output laser beam contains the components of the source voltage frequency (also called power line frequency). If the speed of the motor driving the wheel is not a sub-harmonic, beat frequencies appear in the reflected beam 54.

The perforated mirror 55 is a polished copper plate in which holes have been drilled to permit some of the sample beam 54 from the output laser beam to pass through it. Light which does not pass through this mirror is either scattered or absorbed or is reflected to the slow acting thermo-couple detector 59. A cross-section view of the perforated copper plate 65 of the mirror 55 is shown in FIG. 7. The plate intercepts the beam 54 at 45° at the polished face 66 of the plate. The perforations in the plate are reamed holes 67 of uniform size and distribution throughout the plate. Clearly, the amount of radiation of the incident beam 54 that passes through the plate as the beam 54a, depends upon the angle the plate makes with the incident beam, the density of the holes and the size of the holes. The plate is preferably rigidly mounted in the optical system and may be cooled to maintain dimensional stability. Typically, about one percent of the radiation of the incident beam 54 passes through the plate, about the same is scattered, and about two percent absorbed. Hence, most of the radiation reflects as beam 54b to the relatively slow acting thermo-couple power detector.

The beam 54a that passes through the perforated mirror is attenuated further by the series of fine mesh screens 56 which consist, for example, of three screens 56a, b and c made of stainless steel and soldered together at their periphery, sandwiched between two copper rings 63 and 64. The mesh lines of the three screens are rotated at 60° to each other to reduce or eliminate the formation of Moire patterns and the copper rings 63 and 64 may be cooled to insure dimensional stability of the screens. Where the laser radiation is about 10.6 microns wavelength, the screen mesh may be of the order of 50 wires per inch.

The perforated mirror 55 and the fine mesh screens 56 together attenuate the sample 54 of the output laser beam by about three orders of magnitude. For example, if the output laser beam power is 20 Kw, about 0.6 Kw is impingent upon the perforated mirror which transmits 6 watts of that. The 6 watts is reduced to less than about 1 watt by the fine mesh screens 56 and so, the radiation power focused on the pyroelectric detector 58 is less than about 1 watt. 57 is a convex lens or plano-convex lens which focuses the broad beam transmitted through the aperture plate 55 and the screen attenuators 56 onto the surface of the pyroelectric detector 58. The material of which the lens is made should be transparent to the laser wavelength being focused. For an infrared laser, lenses have been satisfactorily used that are made of zinc selenide. The detector may have an active area about 10 square millimeters or a tenth of a square centimeter. Hence, the power that falls on the detector is about 10 watts per square centimeter. In this case, the temperature of the detector should be kept below that temperature at which its function becomes non-linear. For that purpose, cooling fins (not shown) are connected to the detector and cooled by a flow of air.

Figure 9:
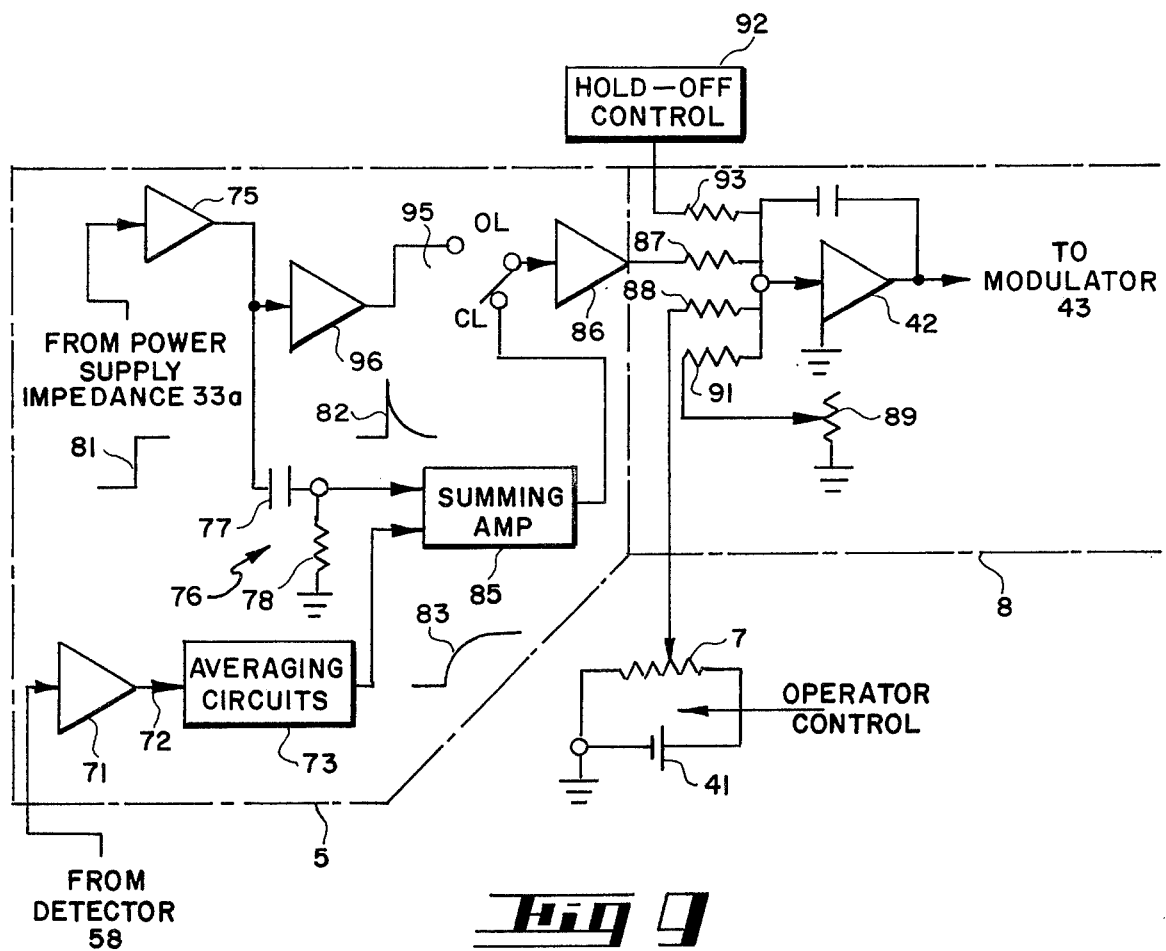
FIG. 9 is an electrical block diagram and schematic of the electrical system which is part of the feedback system.

Turning next to FIG. 9, there is shown an electrical block diagram and schematic of the electrical part of the feedback system including the signal conditioner circuit 5 and portions of the input combining and transmitting circuit 8, shown also in FIG. 1. These circuits respond to three inputs; first, one from the pyroelectric detector 58; second, another from the operator-controlled input signal generator 7 that sets the laser beam output power; and third, a signal derived from the E-beam system that represents the E-beam current and may be derived from the 70 kv power supply 33. The nature of these signals and the way they are combined by the electrical sub-system of the feedback system are explained below.

The detector 58 has a high impedance. This is important, because there may be a considerable length of cable from the detector to other circuit components so the cable capacitance would be significant and would effectively load down the detector reducing the output signal level. To reduce this problem, the output of the detector is fed directly to a pre-amplifier 71 in close proximity to the detector. The pre-amplifier serves as a buffer between the detector and the cable 72 that carries the detected signals. Hence, the cable does not load down the detector and reduce the signal level from the detector. Pre-amplifier 71 is a conventional operational amplifier which characteristically has a high input impedance and a low output impedance. The signal from the detector consists of a series of pulses, one each time a spoke reflector 61 crosses the output laser beam 31. The shape of these pulses may be understood by reference to FIGS. 5 and 6.

Figure 10:
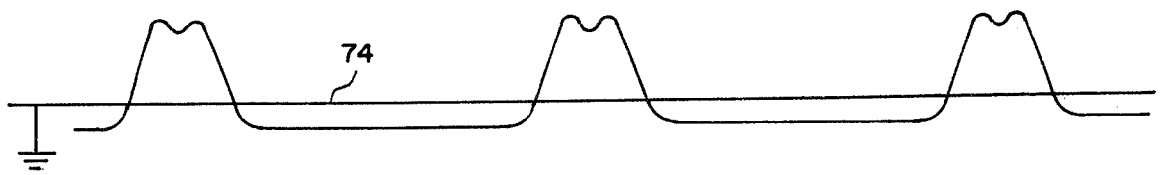
FIG. 10 illustrates the electrical signal wave form output from the pyrolitic detector pre-amplifier.

Since the laser beam has an annular shape (it is more or less hollow), as the elongated mirror 61 swings across the beam, it intercepts a varying amount of radiation and so the reflected laser beam 54 is pulsed and each pulse has the characteristic shape shown in FIG. 6. More particularly, the pulse may exhibit two humps, one at the initiation and one at the end of the pulse, because more radiation is intercepted by the mirror at the beginning and the end of the pulse than at the middle of the pulse. Furthermore, the power density at corresponding points across the beam may be different and may vary and the variation may be temporal. These characteristics of the intercepted laser beam and, hence, of the reflected radiation have been explained above. The result, however, is that the pulses at the output of detector 58 will not be uniform nor will each pulse be symmetrical and a representative sequence of pulses from the detector might appear as illustrated by the waveform of FIG. 10. The problem then becomes to derive a signal from the pulses which is steady when the laser beam power is steady even though there are transient, spacial and temporal intensity fluctuations in the beam. For this purpose, a conventional averaging circuit 73 is provided.

Figure 11:
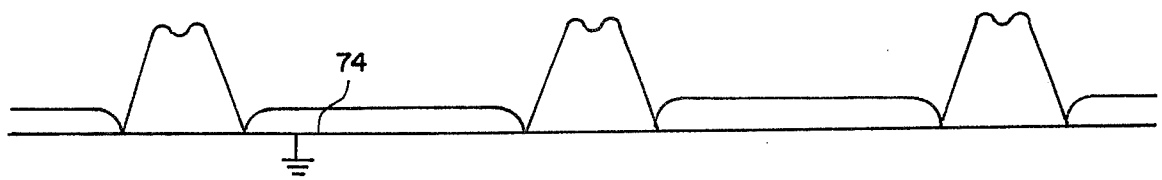
FIG. 11 illustrates the wave form output from the averaging circuit in the electrical system that conditions the signal from the detector.

The effect of the averaging circuit 73 is illustrated in FIGS. 10 and 11. FIG. 10 is the waveform at point 72. Its average voltage is zero since the output amplifier 71 is AC coupled to the averaging circuit 73. The coupling capacitor (not shown) is included in amplifier 71. This signal is fed into a full wave rectifier which approaches the ideal and is included in averaging circuit 73.

FIG. 11 is the waveform at the output of the averaging circuit with the filter capacitor (included in 73) removed. With the filter capacitor attached, a substantially smooth DC level is obtained which is the average voltage of waveform 11.

Hence, simultaneously as the output laser beam rises in response to a change in E-beam current, the amplitude of the pulses from detector 58 also rises and so does the output DC signal level from the averaging circuit. The response of the averaging circuit is inherently slow by comparison to the response of other parts of the system. Clearly, the averaging circuit cannot react as rapidly as other parts of the system, because if it did, the laser power output beam would oscillate at the pulse rate frequency of the pulse train from the detector or, possibly, at a higher frequency. One purpose of the averaging circuit is to remove the pulse rate frequency of the pulses from the detector.

The relatively slow response rate of the averaging circuit means that when the laser output beam power changes abruptly from one level to another, the DC signal level from the averaging circuit will not immediately follow the change. Hence, during transient operation of the laser system, as when the laser output beam power level is intentionally changed from one level to another, the feedback signal from the averaging circuit is inadequate. Comparing such an inadequate feedback signal with the input control signal from generator 7 by the summing amplifier 42 would produce a control signal to the E-beam device calling for more E-beam current than necessary and so the whole system would overload and perhaps oscillate back to stability depending upon the time constants of the system.

This tendency to overload when an abrupt change in laser output power is called for is compensated for by adding the differential of E-beam current to the output of averaging circuit 73. For this purpose, a signal is obtained from the E-beam system that represents the E-beam current. That signal may be obtained from across the power supply impedance 33a (see FIG. 1). The E-beam signal is fed to a conventional non-inverting buffer amplifier 75 in the signal conditioning circuit 5 and the output of that amplifier is differentiated by a conventional differentiating circuit 76 which may consist simply of a capacitor and resistor 77 and 78, respectively, as shown. Where, for example, the E-beam current experiences an abrupt change represented by the waveform 81, then the differential is represented by waveform 82. Meanwhile, the output signal from averaging circuit 73 will appear as represented by waveform 83. Clearly, the differential signal, waveform 82, is the converse of the signal from the averaging circuit and, so by summing these two signals in summing amplifier 85, a conditioned feedback signal is produced which approximates the step function (waveform 81) of the E-beam current during transient conditions and also provides a steady signal during steady operating conditions unaffected by the spacial and temporal fluctuations of the beam.

The summing amplifier 85 that produces the conditioned feedback signal may be a conventional operational amplifier having high input impedance and low output impedance and reverses the phase of the input summation. This output is fed through another conventional operational amplifier 86 to again reverse phase so there is no phase reversal of the signal from the averaging circuit 73, and the output of amplifier 86 is fed to one input of a conventional summing amplifier 42 in the combining and transmitting circuits 8. This summing amplifer may have several inputs. One input is the conditioned feedback signal from amplifier 86 that is fed to input resistor 87 and another input is the operator-controlled input signal from generator 7 that is fed to input resistor 88. Other inputs to summing amplifier 42 may include: an offset input from variable potentiometer 89 to input resistor 91 and the hold-off signal from the stand-by signal generator 92 fed to input resistor 93.

The purpose of the offset signal is to compensate for slight DC voltages appearing in any of the other input signals and which are not desired. The purpose of the stand-by signal is to hold off all signals to the summing amplifier so that the grid bias control voltage for the E-beam device produced by control circuit 32 in the high voltage power supply 6 (see FIG. 1) cuts off the E-beam and no current flows in the E-beam. For example, when the laser system is in the stand-by condition, it is desired that all systems be activated except the E-beam current. Then when the laser is started, the hold-off voltage is removed and the E-beam current rises to the value called for by the operator-controlled input signal. Clearly, the offset signal and the hold-off signal are incidental to the operation of specific laser system incorporating the present invention and they could be omitted in some cases.

An optional part of the conditioning circuit 5 includes the switch 95 that feeds the conditioned feedback signal to amplifier 86 from operational amplifier 96 or summing amplifier 85. Switch 95 has two positions: the closed loop position, denoted CL and the opened loop position, denoted OL. In the closed loop position, the conditioned feedback signal from summing amplifier 85 is fed to summing amplifier 42 and so the complete feedback system is fully effective as described hereinabove to stabilize control of the output laser beam. When the switch is in the opened loop position, the feedback system, including the optical sub-system 4 and the signal conditioned circuit 5 are by-passed and the signal from the E-beam current sensor (impedance 33a shown in FIG. 1) is fed directly to summing amplifier 42 through amplifier 86. The purpose of amplifier 96 is to provide a second reversal of the E-beam current signal. The opened loop feedback clearly ignores the power of the laser beam and attempts to provide control using only feedback from the E-beam system itself without regard for the real output of the system. Hence, the opened loop feedback is less effective than the closed loop feedback and may be provided as a back-up feedback control signal in case of failure of the closed loop system.

Figure 12:
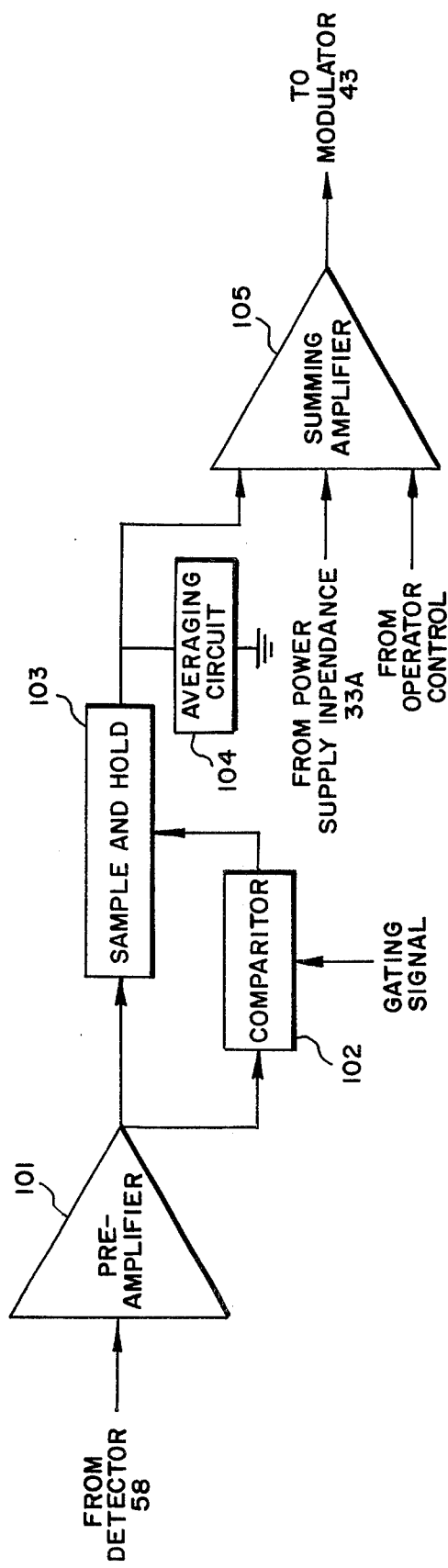
FIG. 12 is an electrical block diagram and schematic of an alternate electrical circuit for transmitting the detector signal.

The summing amplifier 42 is an operational amplifier of conventional design including a number of input impedances already described that feed at least one amplifier stage 97 as shown in FIG. 12. The output may be used to directly control the bias on grid 14 of the E-beam device as shown in FIG. 1. For reasons already described, the output of amplifier 42 is preferably not directly connected to the grid bias control circuit 32 by hard copper wires. It is preferred that it be isolated from the grid bias control circuit because of the high voltage environment of the grid bias control circuit. Hence, as shown in FIG. 1, the output of the summing amplifier 42 is first fed to modulator 43 where it modulates a 10 kHz signal and the modulated signal is amplified by amplifier 45 and applied across the primary winding 37p of transformer 37. The secondary winding 37s in transformer 37 connects directly to grid bias control circuit 32 and imposes a bias signal on the grid voltage that is equivalent to the output signal from summing amplifier 42. In this way, the differential signal between the conditioned feedback signal and the operator-controlled input signal controls the E-beam current density. A null is produced when the two signals are equal which means that the output laser beam is at the power level called for by the input signal. When the conditioned feedback signal exceeds the input signal, the differential signal reduces the E-beam density which, in turn, reduces the output laser beam power. Likewise, when the input signal exceeds the conditioned feedback signal, the E-beam density is increased, increasing the output laser beam power until it meets the level called for by the input signal.

Directing attention now to FIG. 12, there is shown as an alternate embodiment an electrical block diagram and schematic of the electrical part of the feedback system including the signal conditioner circuit 5 and portions of the input combining and transmitting circuit 8 of FIG. 1. As in FIG. 9, these circuits respond to three inputs; first, one from the pyroelectric detector 58; second, another from the operator-controlled input signal generator 7 that sets the laser beam output power; and, third, a signal derived from the E-beam system that represents the E-beam current and may be derived from the 70 kv power supply 33. The nature of these signals and the way they are combined by the electrical sub-system of the feedback system are explained below.

Inasmuch as detector 58 has a high impedance and a considerable length of cable may be involved to get the detector output signal to other components, the output signal of detector 58 is supplied to amplifier 101 which serves to act as a buffer and which has a high input impedance and a low output impedance. The output signal of amplifier 101 is fed to both a comparator circuit 102 and a sample and hold circuit 103. A further gating signal from any suitable source (not shown) is also supplied to comparator 102 whereby when the output signal from amplifier 101 is above a preselectable and adjustable value, the sample and hold circuit 103 is gated to the on condition. The output signal of the sample and hold circuit 103 is smoothed by an averaging circuit 104 of time constant larger than the gating signal by a small factor such as 2.

As previously pointed out, the output of detector 58 is a series of pulses. However, the output signal of the sample and hold circuit 103 is essentially a relatively rapidly varying DC voltage comprising a series of long pulses with a small dip at the end of each pulse which is reduced by averaging circuit 104. Each of these long pulses reflects laser beam power at the time of sampling. Accordingly, the output of the sample and hold circuit 103 represents a nearly direct voltage envelope whose level follows and lags behind laser output power by only a few milliseconds.

The output of the sample and hold circuit 103 is supplied to summing amplifier 105 as is also the signal from the power supply impedance 33a and the signal from the operator control. The signal from impedance 33a is a transient signal with a time constant of typically less than 0.1 second which functions to provide stabilization and prevent power transients such as may occur during turn-on of the laser.

The filter represented by averaging circuit 104 is preferably made broad enough to integrate over approximately two sampling pulses. If the time constant of the control circuit is made about 0.05 second, the response time of the laser to its power supply will be about optimum and under such conditions, the laser power may be accurately controlled by the operator control circuit and may be turned on and off in less than about 0.1 second with optical power independent of drifts in laser operating conditions or variations in the electrical supply mains. The accuracy of control is about ± 3.0 percent. Further, the laser beam output power is constant even if the line frequency changes.

The embodiments of the present invention described herein show a method and apparatus for controlling the output of an electron beam-sustainer-type laser with a feedback system that detects the output power of the laser beam. The details of the electron beam-sustainer-type laser described herein, as well as a number of details of both the optical and the electronic aspects of the feedback system are given by way of example of the best-known use of the invention and are not intended to limit the spirit or scope of the invention as set forth in the appended claims.

What is claimed is:

1. In a method of producing a coherent beam of radiation from a gaseous medium in an enclosure, the steps comprising:
   a. providing said gaseous medium at a predetermined pressure in a working region in the enclosure;
   b. generating external of said enclosure a substantially broad area electron beam having a cross section area conforming substantially to said working region;
   c. introducing said electron beam to said enclosure to produce in the working region a substantially spacially uniform predetermined density of secondary electrons in the medium;
   d. providing an electric field in the working region which increases the average energy of said secondary electrons therein without substantially increasing the electron density therein;
   e. the energy of said secondary electrons being sufficient to stimulate the emission of said coherent beam of radiation;
   f. causing said beam of coherent beam of radiation to eminate from the enclosure;
   g. intercepting the eminating beam of coherent radiation;
   h. converting said intercepted radiation into an electrical feedback signal representative of the power thereof; and
   i. employing said electrical feedback signal to control the electron beam, thereby providing a feedback system for controlling the coherent beam of radiation.

2. A method as in claim 1 further including the steps of:
   a. providing an input signal;
   b. combining said input signal with said feedback signal; and
   c. employing said combined signals to control the electron beam.

3. A method as in claim 2 wherein:

a. the combining of said signals produces a difference signal which is proportional to the difference between the combined signals; and
b. the difference signal controls the electron beam.

4. A method as in claim 3 wherein:
a. the beam of radiation is intercepted intermittently at substantially regular intervals to provide pulses of radiation; and
b. the electrical feedback signal is derived from said pulses of radiation.

5. A method as in claim 4 wherein:
a. at each interception of the beam of radiation, the whole beam is intercepted.

6. A method as in claim 5 wherein:
a. the interception of the beam is by a mirror of area substantially less than the cross section area of the beam of radiation; and
b. during said interception all areas of the cross section of the beam are intercepted by the mirror.

7. A method as in claim 6 and further including the step of:
a. reflecting the intercepted radiation by the mirror to a radiation responsive device that converts the energy of the radiation to said electrical feedback signal.

8. A method as in claim 4 and further including the step of:
a. averaging the pulses in the electrical feedback signal producing a substantially steady feedback signal, the level of which is representative of the intensity of the beam of radiation; and
b. said steady feedback signal is combined with the input signal.

9. A method as in claim 8 and further including the step of:
a. electrically rectifying the pulses to accomplish said averaging.

10. A method as in claim 9 and further including the step of:
a. electrically removing the DC component from said pulses before electrically rectifying the pulses.

11. A method as in claim 8 and further including the steps of:
a. providing a signal representative of the electron beam energy;
b. differentiating said signal representative of the electron beam energy producing an electron beam energy differentiated signal;
c. combining said electron beam energy differentiated signal with said steady feedback signal producing a conditioned feedback signal; and
d. combining said conditioned feedback signal with said input signal.

12. In an electric discharge flowing gas laser system having electrical discharge producing means including electron beam producing means for producing an electrical discharge in the flowing gas and means for stimulating a coherent beam of radiation and coupling said radiation out of said system to produce an output laser beam, a method of controlling the intensity of the output laser beam comprising the steps of:
a. intercepting the laser beam at regular intervals by at least one beam reflector, the reflecting surface of which is at an angle to the direction of the beam;
b. optically intercepting all of the reflecting radiation;
c. optically transmitting a spacially uniform fraction of the intercepted reflected radiation;
d. optically focusing said transmitted radiation on the radiation responsive portion of an electrical signal transducer that converts the energy of said radiation to an electrical signal whereby the transducer produces a first electrical signal representative of the power of the laser beam;
e. providing an input signal representative of the desired power of the laser beam;
f. providing a differentiated signal representative of changes in electron beam intensity;
g. combining said first electrical signal and said differentiated signal with said input signal to produce a second electrical signal;
h. combining said second signal with said input signal to produce a difference signal which is proportional to the difference between said combined signals; and
i. employing said difference signal to control the power of said output laser beam.

13. A method as in claim 12 wherein:
a. the mirror intercepts the laser beam radiation by moving across the beam so that during said interception every part of the beam in cross section impinges upon the mirror.

14. A method as in claim 13 wherein:
a. a plurality of mirrors are provided uniformly spaced apart;
b. the mirrors are spacially driven so that they sequentially cross and intercept and reflect the laser beam at regular intervals; and
c. whereby the radiation focused on the transducer is intermittent at said intervals.

15. A method as in claim 13 wherein:
a. the mirrors are arranged at positions relative to each other as the spokes on a wheel and driven in rotation about an axis with respect to which the mirrors are oriented radially; and
b. whereby the rate of rotation of the mirrors about the axis and the number of the mirrors determines the rate of intermittence of the radiation focused on the transducer.

16. A method as in claim 15 wherein:
a. the electrical signal produced by the transducer includes pulses; and
b. the pulse rate frequency of the pulses is determined by the rate of rotation of the mirrors about the axis.

17. A method as in claim 4 wherein:
a. the beam is intercepted intermittently at intervals comprising an exact multiple of the power line frequency.

18. A method as in claim 16 wherein:
a. the power of radiation focused on the transducer is a precise small percentage of the power of the intercepted laser beam.

19. A method as in claim 18 wherein:
a. the transducer is a pyroelectric detector and the power of radiation focused thereon is less than that effective to cause excessive heating of said detector.

20. A method as in claim 19 wherein:
a. the laser output is approximately the wavelength $10^{-5}$ meters; and
b. the radiation directed to the pyroelectric detector is focused through a lens of zinc selenide transparent to the wavelength of the intercepted laser beam.

21. A method as in claim 20 wherein:
a. the controlled power of the intercepted laser beam is substantially independent of the power line frequency.

* * * * *